Oct. 21, 1947.  J. STEPHEN  2,429,532
FIFTH WHEEL LOCKING MECHANISM
Filed July 12, 1945
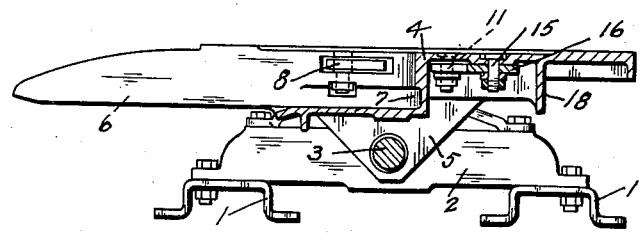
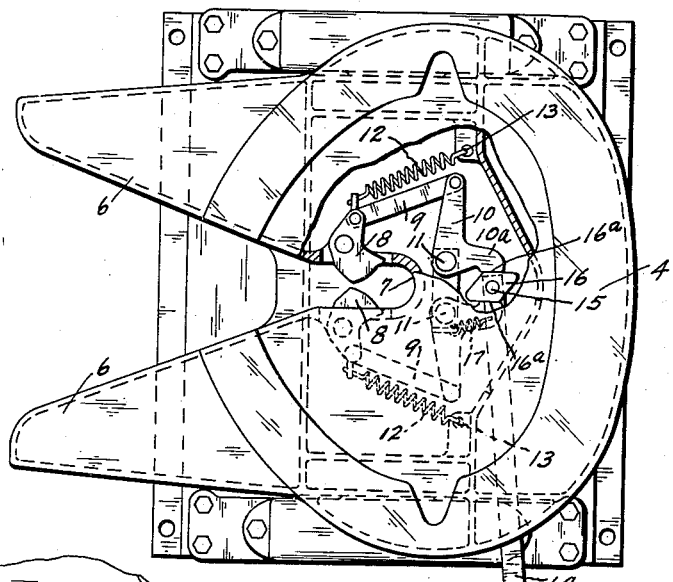
INVENTOR.
James Stephen
BY Robert Robb
Attorneys.

Patented Oct. 21, 1947

2,429,532

UNITED STATES PATENT OFFICE 2,429,532

FIFTH WHEEL LOCKING MECHANISM

James Stephen, Edgerton, Wis., assignor to Highway Trailer Company, Edgerton, Wis., a corporation Application July 12, 1945, Serial No. 604,682

8 Claims. (Cl. 280—33.1)

This invention relates to improvements in what are commonly known today as rocking fifth wheel units employed for connecting tractor pulling vehicles with trailer vehicles, the combined vehicle being ordinarily known as a tractor semi-trailer.

In the rocking fifth wheel unit there is comprised a lower rocking fifth wheel on which are mounted king pin locking jaws, with which are engaged the king pin member of an upper king pin fifth wheel, usually attached to the under front portion of a trailer vehicle. The locking jaws are operated automatically upon the backing of the tractor vehicle with its inclined rocking fifth wheel, into the trailer vehicle for connection at the king pin fifth wheel at the front of the latter, for the purpose of automatically connecting the vehicle. Said jaws are usually manually operated in order to permit of unlocking of the jaws and separation of the tractor vehicle from the trailer vehicle.

My present invention is designed to improve upon the construction and operation of the jaw mechanism of the rocking fifth wheel, whereby certain occasional defective operation in the action of these jaws resulting in accidental separation of the two vehicles under special conditions of their movement, is avoided, as will more fully appear upon having an understanding of the special improved jaw locking mechanism of my present improvements as hereinafter set forth.

A full understanding of my invention will be had upon reference to the accompanying detail description and the attached drawings, in which:

Figure 1 is a top plan view of a rocking fifth wheel such as usually mounted upon a tractor vehicle, the surface portion of the fifth wheel being broken away to more clearly show one of the locking jaws and the operating means therefor, which works also in conjunction with the other jaw, certain operating parts of which are illustrated in dotted lines. In this view the jaws are shown in their locked position, as when the tractor vehicle and trailer vehicle are hitched together under travel condition.

Figure 2 is a central longitudinal sectional view of the construction shown in Figure 1.

Figure 3 is a fragmentary bottom plan view, bringing out more clearly the jaw mechanism and the spring features cooperating with the parts thereof, the locking lever being shown in its position when the jaws are unlocked, said lever partly broken away.

Specifically describing the improvements of my present invention, and referring particularly to Figures 1 and 2 of the drawing, I note that in these figures there is illustrated the lower so-called rocking fifth wheel which is mounted on the rear portion of the tractor vehicle under ordinary operating conditions, the type of fifth wheel shown being generally that disclosed by the Martin and Farr Patent 1,412,025, issued April 4, 1922, and known today as the Martin type fifth wheel.

In the construction of my fifth wheel, I utilize a suitable base frame generally shown at 1, and supporting the side members 2 carrying the cross shaft 3 to which the fifth wheel 4 proper is pivoted by means of suitable spaced brackets, one of which is shown at 5 in Figure 2 of the drawing. The shaft and bracket mounting just described permits of a pivotal or rocking movement of the fifth wheel 4 upon its supporting parts described.

Now the fifth wheel of the present improved invention is a split fifth wheel in that it is provided with the spaced diverging guide members 6 by which the king pin of the upper fifth wheel of the trailer, not shown, is guided as the rocking wheel 4 is backed against the said upper fifth wheel, the king pin finally arriving as an incident to the guiding function of the parts 6, in the king pin socket which is designated 7 in the drawing. As the said kind pin moves into connection with the rocking fifth wheel 4, the pin will strike and pass the two complementary jaw members 8 which are pivotally mounted at opposite sides of the entrance to the king pin socket 7. The jaw members 8 move apart as the king pin enters the socket 7, and in this action said members rock inwardly or in opposite directions from each other. The jaw members 8 are connected by links 9 to bell crank shaped lock members 10 which are pivoted at 11 to the fifth wheel 4 at the under side of the latter, and the pivot members at 11 may be bolt or other kind of members suitable for the purpose, the same depending from the under side of the fifth wheel 4, because the jaws 8, members 9, and the members 10 are carried upon said under side of the fifth wheel.

Normally the jaw members 8 are held in their positions projecting across the entrance to the socket 7 by means of coil springs 12 anchored at one end as shown at 13 to the under side of the fifth wheel 4 and connected at their opposite ends to the outer arm of the jaw members 8.

For positively locking the jaw members 8 in their positions as shown in Figure 1, after the king pin has passed these jaw members and entered the king pin socket 7 I utilize a locking lever 14 pivotally mounted on the under side of the fifth wheel 4 at the point designated 15 and adapted to swing upon an arc in the direction of curvature of the closed end of the fifth wheel 4 which is the right end as viewed in Figures 1, 2 and 3. At its pivoted end the locking lever 14 is equipped with a somewhat diamond-shaped cam member 16 having flats 16a at opposite sides thereof and arranged to operate intermediate the heel or longitudinal arm 10a of the locking members 10. When the heel portions 10a of the members 10 engage the flats 16a the jaws 8 are positively locked against separation and prevent the exit of the king pin from the king pin socket 7 under travel conditions with the tractor vehicle connected with the trailer vehicle by means of the fifth wheel unit hereinbefore referred to, as fully shown in the Martin patent previously identified, as to principle of operation, such operation, however, being improved upon in respects that will be more fully shown as this description proceeds.

There is connected with the locking lever 14 a coil spring 17 attached to the lever near its pivotal end and said spring is secured also to a small bracket member 18 on the under side of the fifth wheel. The utility of the said spring 17 will now be set forth in my description of the general operation of my invention.

It will be assumed that the fifth wheel as shown in Figure 1 is operating as a connection between the tractor vehicle and the trailer vehicle, under travel conditions, the king pin of the trailer vehicle being received and locked in the socket members 7 of the fifth wheel 4. The combined tractor semitrailer having arrived at its destination, for example, and it being desired to drive away the tractor, and therefore disconnect the trailer therefrom, the operator will swing the lever 14 from the position shown in Figure 1 by which the cam 16 locks the jaws 8, to the approximate position of Figure 3 wherein the cam 16 has been turned so as to shift the same to a position moving the lock members 10 to rock the links 9 rearwardly and rock the jaws 8 to their separated positions as illustrated in Figure 3. With this adjustment of the parts as shown in Figure 3, the tractor vehicle may drive forward so as to leave the trailer vehicle standing upon its supporting props with which it is equipped at the front end thereof. As the tractor vehicle moves forwardly, it carries with it the fifth wheel 4 and in this action the king pin of the trailer vehicle engages the locking portions of the jaws 8 so as to slightly push the same apart from their unlocked position of Figure 3, thereby causing a pull on the links 9 which correspondingly rocks the lock members 10 to slightly separate the heel or arm portions 10a of the latter. This action relieves the friction of the engagement of the pointed portions of the cam as seen in Figure 3, with the facing side portions of the members 10a and permits the spring 17 to very quickly shift the locking lever 14 to its original locked position as shown in Figure 1, at the same time restoring the members 8 to their locked position as shown in the same figure. The locking mechanism of the fifth wheel 4 is in this manner pre-set and ready for re-locking engagement with the king pin of another trailer when the tractor is backed into the latter.

It will be seen from the foregoing that the lock members 10 are individually or independently movable under the action of movement of the jaw members 8. This is an important phase of the improvement of my invention, functionally speaking, by which advantage is derived as compared with the construction of the jaw locking mechanism utilized in the type of fifth wheel called the Martin type and referred to in the Martin et al. patent previously identified.

Thus, on the coupling of the tractor equipped with the fifth wheel 4, with a trailer vehicle succeeding the uncoupling operation previously described, as the king pin of the trailer vehicle enters the rearwardly moving tractor vehicle fifth wheel 4, the king pin will strike the jaws 8, separate these jaws by a movement involving the movement of the links 9 and the lock members 10, while the lock lever 14 remains in the position of Figure 1, and as soon as the king pin has fully entered the socket 7, the jaws 8 having separated to permit this, the jaws resume their positions of Figure 1 and hold the king pin firmly locked against movement.

In the unlocking movement of the lever 14 it is limited in being shifted to the position of Figure 3 by means of a notch in the flange 18 extending downwardly from the fifth wheel 4. The frictional engagement of the cam 16 is depended upon to maintain the lever 14 temporarily in the position of unlocking of the jaws 8 as seen in Figure 3.

In the Martin type of fifth wheel, previously referred to, the jaw members which lock the king pin are connected together by means of the manual device attached thereto indirectly for causing opening or unlocking movement of said jaws. In other words, if one of the jaws of the Martin type wheel moves toward unlocking position the other jaw is caused to correspondingly so move. Under some conditions of operation of tractor semi-trailer vehicles, as particularly as when the tractor vehicle is pulling a trailer up an ascent and upon a curve, the king pin of the trailer fifth wheel has a tendency to deflect from a true horizontal position and ofttimes this action exerts a special outward pressure on one of the jaws of the locking mechanism so as to not only tend to move the same, but, through its connection with the other jaw, tend to slightly open the latter. Under some conditions of operation as referred to, the two jaws, being operably connected, have simultaneously slightly spread and permitted the tractor vehicle to be unhitched or disconnected from the trailer vehicle, resulting in accidents and damage to the trailer vehicle when it falls under such abnormal condition.

With my present improved construction of jaw members 8 and their method of independent operation, it will be evident that the action of the king pin in the defective operation just described cannot take place because, even if a slight tendency toward opening is caused on the part of one of the jaws 8, this tendency is not transmitted by any movement whatsoever to the other jaw for the simple reason that the two jaws are not connected together for simultaneous movement one from the other in any way, though they may be separately simultaneously actuated by the entering action of the king pin into the king pin socket 7.

By reason of the improvements in my invention it is not possible for any accidental uncoupling of a tractor vehicle from a trailer vehicle to take place at any time during the travel movement of the vehicle and irrespective of whatever particular position of angularity may occur in respect to the position of the tractor vehicle pertaining to that of the trailer vehicle under travel conditions. Moreover, my locking mechanism is simple and sufficient in its action and permits of very quick uncoupling operation as well as resetting of the locking jaws for effective use on recoupling the tractor and trailer vehicle.

Having thus described my invention, what I claim as new and desire to secure by Letters Patent of the United States is:

1. A fifth wheel unit for tractor-trailer vehicles, comprising a split fifth wheel having king pin guide members and a king pin socket at the inner ends of the latter, locking jaws at opposite sides of the socket to hold a king pin in said socket, means normally holding said jaws in locking positions across the mouth of the socket, separate disconnected movable lock members each operably connected to one of the jaws, and a manual operating member coacting with said lock members with separate locking effect on each, and operable to actuate the lock members to move the jaws to open positions.

2. A unit as claimed in claim 1, in which the means normally holding said jaws in locking positions include separate springs one connected to each of the jaws to move same to king pin locking positions.

3. A unit as claimed in claim 1, combined with a cam to engage the lock members to move the jaws to open positions, said cam then frictionally coacting with the lock members to hold the manual member positioned with the jaws open, and means to restore the manual member and cam to jaw locking position on subsequent movement of the jaws in the direction of their opening movement.

4. A unit as claimed in claim 1, combined with a cam to engage the lock members to move the jaws to open positions, said cam then frictionally coacting with the lock members to hold the manual member positioned with the jaws open, and means to restore the manual member and cam to jaw locking position on subsequent movement of the jaws in the direction of their opening movement, comprising a spring connected to the manual member, each jaw and its associated lock member being movable separately from its associated jaw and lock member.

5. A unit as claimed in claim 1, combined with a cam actuated by the manual member to move the lock members to jaw unlocking positions, and by frictional engagement with the lock members hold the jaws in such unlocking positions, but projecting slightly across the mouth of the socket for tripping operation, said projecting positions of the jaws being such that they will be tripped by a king pin as it leaves said socket, thereby to release the manual member from its said holding position.

6. A unit as claimed in claim 1, combined with a cam actuated by the manual member to move the lock members to jaw unlocking positions, and by frictional engagement with the lock members hold the jaws in such unlocking positions, but projecting slightly across the mouth of the socket for tripping operation, said projecting positions of the jaws being such that they will be tripped by a king pin as it leaves said socket, thereby to release the manual member from its said holding position, and means for pulling the manual member to its jaw locking position when released.

7. A unit as claimed in claim 1, combined with a cam actuated by the manual member to move the lock members to jaw unlocking positions, and by frictional engagement with the lock members hold the jaws in such unlocking positions, but projecting slightly across the mouth of the socket for tripping operation, said projecting positions of the jaws being such that they will be tripped by a king pin as it leaves said socket, thereby to release the manual member from its said holding position, and a spring for pulling the manual member to its jaw locking position when released.

8. A fifth wheel unit for tractor-trailer vehicles, comprising a split fifth wheel having king pin guide members and a king pin socket at the inner ends of the latter, locking jaws at opposite sides of the socket to hold a king pin in said socket, separate disconnected lock members, each individually connected with an associated jaw to hold the latter in locked position, locking and operating means for the said lock members for holding each in locked position independently of the other, and independent means to move the jaws to locking positions.

JAMES STEPHEN.

REFERENCES CITED

The following references are of record in the file of this patent:

UNITED STATES PATENTS

| Number | Name | Date |
|---|---|---|
| 1,412,025 | Martin et al. | Apr. 4, 1922 |
| 1,862,112 | Davis | June 7, 1932 |
| 2,138,679 | Sherman | Nov. 29, 1938 |